Feb. 19, 1957  A. J. KACHNIK  2,782,079
RAILROAD COASTER
Filed Sept. 10, 1954

INVENTOR
Anton J. Kachnik.
BY
Gustav Miller
ATTORNEY

United States Patent Office 2,782,079
Patented Feb. 19, 1957

2,782,079
RAILROAD COASTER
Anton J. Kachnik, Chicago, Ill.

Application September 10, 1954, Serial No. 455,225

7 Claims. (Cl. 308—180)

This invention relates to anti-friction bearings of the multiple layer type wherein there are a plurality of layers of roller bearings with each layer arranged concentrically with the others. The invention more particularly relates to multiple layer type coaster bearings, such as are used in connection with journal boxes for railroad cars, wherein at least a part of the bearing is arranged to float free of both the fixed and the rotatable member.

One object of the present invention is to provide a roller bearing of the character described wherein there is obtained extremely smooth performance and an easy support of heavy rotatable weights.

Another object of the present invention is to provide a roller bearing of the character described wherein the friction between rotatable parts is reduced to the point where a great economy of power and expenditure of fuel is obtained.

Another object of the present invention is to provide a roller bearing assembly particularly suitable for use with the journal boxes of railroad cars and the like, wherein heavy loads under great vibration must be borne.

Another object of the present invention is to provide a roller bearing assembly for the journal boxes of railroad cars or the like, wherein an auxiliary bearing device is provided which automatically takes up the load in the event of failure of the roller bearings so that the creation of a hot box is avoided.

Other objects of the present invention are to provide an improved roller bearing of the character described that is easily and economically produced, which is sturdy in construction and which is highly effective in operation.

With the above and related objects in view, this invention consists in the details of construction and combination of parts, as will be more fully understood from the following description, when read in conjunction with the accompanying drawing, in which.

Figure 1:
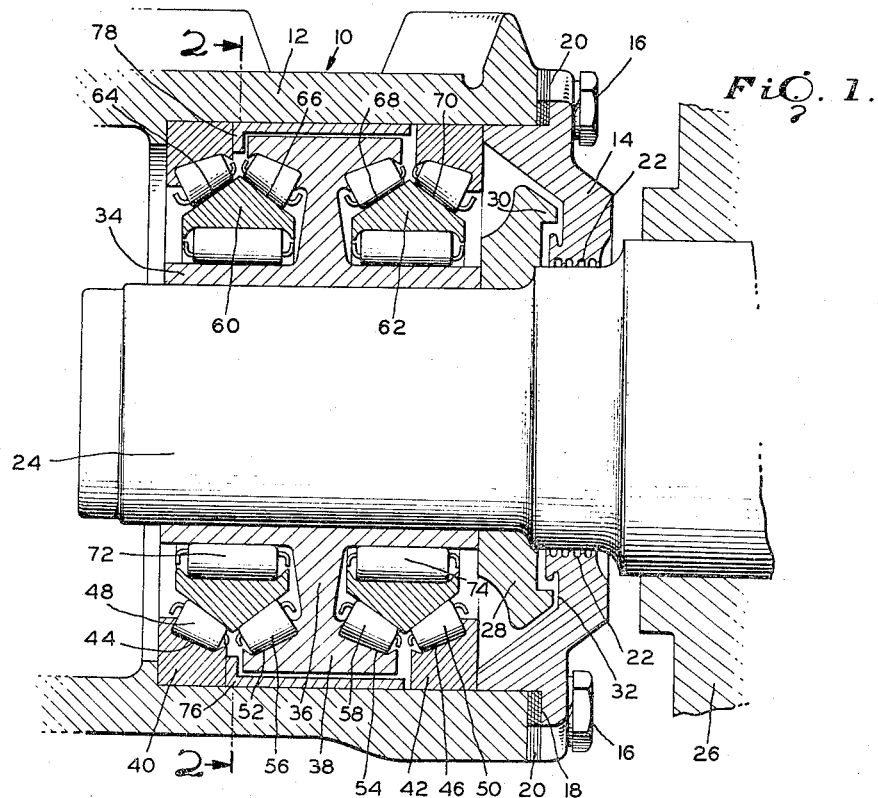
Fig. 1 is a cross-sectional view of a bearing embodying the present invention, this bearing being shown as part of a journal box supporting a wheel shaft such as those used for railroad cars.
Figure 2:
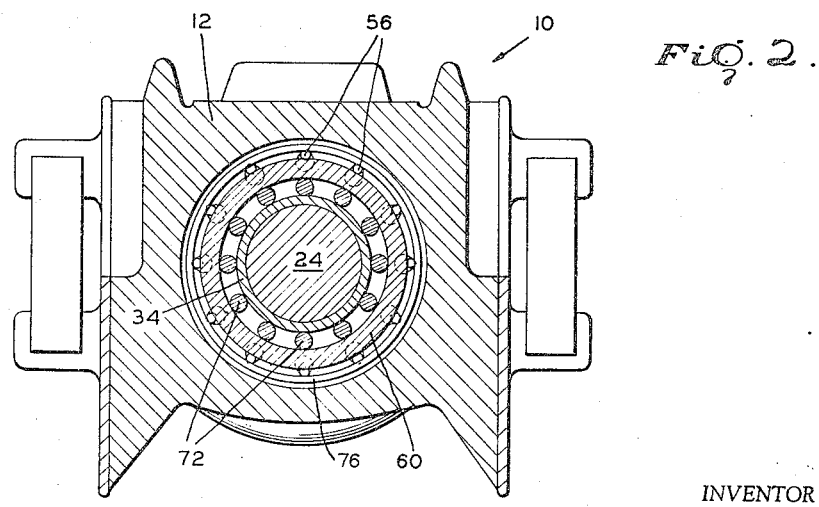
Fig. 2 is a cross-sectional view taken on line 2—2 of Fig. 1.

Referring now in greater detail to the drawings, wherein similar reference characters refer to similar parts, there is shown a fixed bearing support or journal box, generally designated 10, comprising an open-ended, cylindrical housing 12 and a pair of end plates adapted to close the open ends of the housing, one of these end plates being shown at 14. The end plate 14 is connected to the housing 12 by bolts or the like indicated at 16. The bolts hold the shoulder 18 of the end plate 14 against annular shims 20 which are arranged between the shoulder 18 on the end plate and the open end of the housing. The number of shims 20 may be varied as desired to adjust the position of the roller bearing assembly relative to the shaft.

The end plate 14 is provided with a central opening, there being a plurality of channels 22 extending radially outward from the opening. These channels are provided for the purpose of holding sealing rings or the like between a shaft 24, of the type used to mount the wheels of a railroad car, extending through the opening and the internal peripheral wall of the plate around the opening. A railroad wheel 26 is connected to the shaft 24 exteriorly of the housing 12; and within the housing the shaft is provided with a ring 28. The ring 28 is provided with a flange 30 which is adapted to extend into a guide recess 32 in the plate 14. The parts 10, 12, 14, 16, 20, 22, 24, 26, 28, 30 and 32 typify the ordinary journal boxes now in use on railroad cars and engines and, by themselves, are not meant to constitute part of applicant's invention. They are shown only to demonstrate how applicant's type of bearing can be used with present day journal boxes.

Also fixed to the shaft 24 within the housing 12 is a sleeve 34. The sleeve 34 is positioned at one end adjacent the ring 28 and is provided centrally thereof with an annular web 36 which is integral with an annular race member 38 at the outer perimeter thereof.

A pair of rings 40 and 42 are provided within the housing 12, one at each side of the race member 38. Each of these rings have an inclined recess or channel, as at 44 and 46, these channels being adapted to act as raceways for conical roller bearings 48 and 50. The channels 44 and 46 and the rollers 48 and 50 are inclined oppositely to channels 52 and 54 on opposite sides of the race member 38, there being roller bearings 56 and 58 provided within these last named channels. As has been implied above, the shims 20 are used to adjust the relative position of bearing members 40, 41 and 42, 48, 49 and 50, 60, 61 and 62, 56, 57 and 58 and 38. The relative position of the bearing and shaft is controlled by ring 28.

Positioned radially inward of the race members 38, 40 and 42 are race members 60 and 62, each of which is provided with two oppositely inclined surfaces, as at 64 and 66 on member 60 and 68 and 70 on member 62. These inclined surfaces on the two inner race members 60 and 62 act to support the rollers 48, 56 and the rollers 50, 58 between these inner race members and the outer race members 38, 40 and 42. The race members 60 and 62 are provided on their inner annular walls with channels which support cylindrical roller bearings 72 and 74 between themselves and the sleeve 34.

From the above described structure, it is apparent that the annular race members 60 and 62 are rotatably mounted for free movement between the roller bearings on each side thereof. This free floating mounting of these central race members provides an additional rotational bearing support in addition to the roller bearings themselves and makes for even less than usual friction between the roller bearings and the race members. It should here be noted that although the use of such floating race members is not necessarily new, it is new to provide such a floating race member between two sections of the bearing sleeve of a shaft so that the shaft is supported almost entirely free of the fixed bearing support or journal box. The result is an exceedingly smooth and substantially frictionless mounting for the rotatable shaft and consequently a much smoother movement of the vehicle, such as a railroad car, over the roadbed.

A sleeve 76, having a perpendicular flange 78 at one side, adapted to fit within a recess between the race members 38 and 40, encircles the outer race member 38 and is positioned between this member 38 and the inner wall of the cylindrical housing 12. This sleeve 76 is preferably formed of a substance which goes by the trade-name "Sinite," a substance manufactured by Booker-Cooper Inc., North Hollywood, California. This "Sinite" comprises a mass of spherical metal particles, preferably made of bronze, which are mixed with a material such as molybdenum sulfide, graphite, lead, silver or the like, which act as lubricants, and with a synthetic resin binder. This composition has a Rockwell hardness of 85, a compressive strength of approximately 22,700 p. s. i., and an excellent coefficient of friction at temperatures ranging between about 120° F. to about +600° F. This sleeve 76 is adapted to be used as an emergency bearing in the event any failure occurs in the roller bearings while in motion. If such trouble occurs, the bearing sleeve 76 can carry the frictional load until the defect is detected and eliminated, thereby reducing or eliminating the possibility of a hot box in the event of failure of the regular roller bearings. It is a feature of the "Sinite" bearing that it is adapted to operate either in the wet or dry state.

Although this invention has been described in considerable detail, such description is intended as being illustrative rather than limiting, since the invention may be variously embodied, and the scope of the invention is to be determined as claimed.

The invention claimed is:

1. A roller bearing assembly comprising a housing, a sleeve enclosed within the housing and adapted to receive a rotatable shaft, a roller bearing race member within said housing radially spaced from one side of said sleeve, a second roller bearing race member within said housing radially spaced from the other side of said sleeve, a ring member on each side of said sleeve positioned between said sleeve and each of said race members, roller bearings positioned between said sleeve and said ring members, other roller bearings positioned between said ring members and said race members, said ring members being entirely supported between said roller bearings, and an anti-friction sleeve fixed to said housing and encircling said first sleeve but spaced slightly therefrom while said roller bearings are operative, but automatically contacting said first sleeve on failure of said roller bearings to provide a load bearing journal.

2. A roller bearing assembly comprising a housing, an opening in said housing through which a rotatable shaft is adapted to extend, a sleeve in said housing adapted to encircle said shaft and to be fixed thereto, an annular wall surrounding said sleeve and integrally connected thereto by an annular web, a pair of channels formed on the radially inner surface of said wall, there being one channel on each of two opposite sides of said web, a pair of ring members encircling said sleeve, one on each side of said web, each of said ring members having a channel formed on the radially inner surface thereof, roller bearings positioned in said last mentioned channels between said ring members and said sleeve, and other roller bearings between said ring members and said wall, the last mentioned roller bearings being positioned in the channels on said wall, a race member provided in said housing at each of two opposite sides of said wall, there being additional roller bearings positioned between said race members and said ring members.

3. The roller bearing assembly of claim 2, wherein the radially outer surfaces of said ring members have at least one inclined portion and wherein the channels on said wall are inclined oppositely to the inclined portions of said ring members, the roller bearings positioned between said ring members and said wall being positioned between the inclined channels and the inclined portions, said roller bearings being conical in shape.

4. The roller bearing assembly of claim 3 wherein the roller bearings positioned in the channels on the radially inner side of the ring members are cylindrical.

5. A roller bearing assembly comprising a housing, an opening in said housing adapted to receive a rotatable shaft, a sleeve in said housing adapted to be connected in said shaft and providing laterally spaced race members, an annular roller bearing race member connected to said sleeve on each side thereof but radially spaced therefrom, third annular roller bearing race members provided in said housing spaced outwardly from each said second race members, a free-floating annular race member between each said first and second race members and said sleeve race members, roller bearings between said sleeve and said free-floating race member and between said free-floating race member and said second and third race members, and an anti-friction sleeve fixed to said housing and encircling said first sleeve but spaced slightly therefrom while said roller bearings are operative, but automatically contacting said first sleeve on failure of said roller bearings to provide a load bearing journal.

6. A journal box for use with a railroad car comprising a housing, a wheel axle extending through said housing, a sleeve encircling and fixed to said axle within said housing, a pair of rings concentric with said sleeve and spaced therefrom by a plurality of roller bearings, an annular flange extending from said sleeve between the rings of said pair and having its outer portion at least partially overlying each said ring and spaced therefrom by roller bearings, a sleeve of anti-friction material fixed to said housing encircling said annular flange and slightly spaced therefrom while said roller bearings are operative, said anti-friction sleeve automatically cooperating with said annular flange to provide a load bearing journal on failure of said roller bearings, and a railroad wheel mounted on said axle exteriorly of said journal box.

7. For use, in combination with a railroad car, a journal box for supporting a wheel of the railroad car, the wheel being mounted on an axle extending through the journal box, said axle being supported substantially free of the walls of said journal box by roller bearings, said roller bearings being positioned within spaces enclosed by and on opposite sides of an encircling annular flange connected to said axle, a free-floating ring in each enclosing space spacing said roller bearings from each other, and an anti-friction sleeve fixed to a wall of said journal box and encircling said annular flange but slightly spaced therefrom while said roller bearings are operative, said anti-friction sleeve automatically cooperating with said annular flange to provide a load bearing journal on failure of said roller bearings.

References Cited in the file of this patent
UNITED STATES PATENTS

| | | |
|---|---|---|
| 731,720 | Thomas | June 23, 1903 |
| 757,115 | Hoshor | Apr. 12, 1904 |
| 1,146,875 | Hess | July 20, 1915 |
| 1,384,002 | Sundhaussen | July 5, 1921 |
| 1,800,564 | O'Connor | Apr. 14, 1931 |
| 2,187,307 | Friend | Jan. 16, 1940 |
| 2,470,264 | Richardson | May 17, 1949 |